United States Patent
Kuter et al.

(10) Patent No.: US 6,876,729 B1
(45) Date of Patent: Apr. 5, 2005

(54) BOOKMARKING VOICE MESSAGES

(75) Inventors: Joseph W. Kuter, Brighton, CO (US); Gordon R. Brunson, Broomfield, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/441,106

(22) Filed: Nov. 16, 1999

(51) Int. Cl.[7] .............................................. H04M 1/64
(52) U.S. Cl. ................ 379/88.22; 704/251; 379/88.11; 379/88.13; 379/68
(58) Field of Search ................................ 704/251, 270, 704/233, 257, 201, 253; 379/67.1, 88.11, 88.12, 88.13, 201, 88.01, 88.22

(56) References Cited

U.S. PATENT DOCUMENTS

| | | | | |
|---|---|---|---|---|
| 5,668,863 A | * | 9/1997 | Bieselin et al. | 379/202.01 |
| 5,922,045 A | * | 7/1999 | Hanson | 709/206 |
| 6,185,527 B1 | * | 2/2001 | Petkovic et al. | 704/231 |
| 6,199,076 B1 | * | 3/2001 | Logan et al. | 434/319 |
| 6,289,212 B1 | | 9/2001 | Stein et al. | 455/412 |
| 6,535,586 B1 | | 3/2003 | Cloutier et al. | 379/88.13 |
| 2002/0087643 A1 | | 7/2002 | Parsons et al. | 709/206 |

FOREIGN PATENT DOCUMENTS

| EP | 0 679 005 A1 | 10/1995 | H04M/3/50 |
|---|---|---|---|
| EP | 0679005 | * 10/1995 | H04M/3/50 |
| EP | 0 856 979 A2 | 8/1998 | H04M/3/50 |

OTHER PUBLICATIONS

"Intuity AUDIX Multimedia Messaging System," Lucent Technologies, 1999.
"Octel Visual Messenger, the First OpenOctel Application," Lucent Technologies, Jan. 19, 1998.

* cited by examiner

*Primary Examiner*—Roland Foster
*Assistant Examiner*—Olisa Anwah
(74) *Attorney, Agent, or Firm*—Haverstock & Owens LLP (57) ABSTRACT

A voice message is bookmarked by marking the voice message with a bookmark in a bookmark location. The voice message is accessed at the bookmark location by selecting the bookmark.

20 Claims, 6 Drawing Sheets

BOOKMARKING VOICE MESSAGES

FIELD OF THE INVENTION

This invention relates to the field of voice messaging. More particularly, this invention relates to the field of accessing specific information within a portion of a voice message.

BACKGROUND OF THE INVENTION

Figure 1:
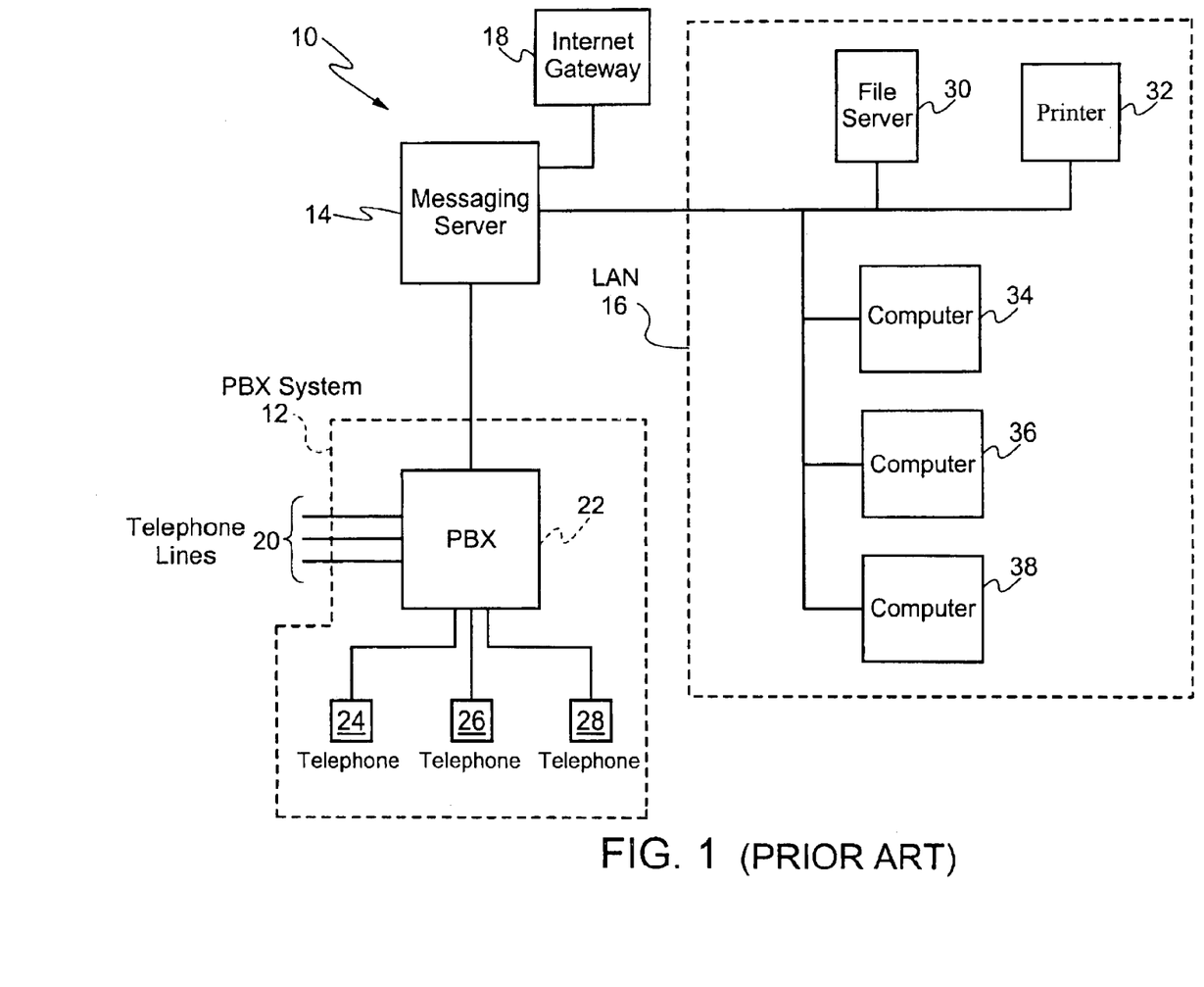
FIG. 1 illustrates a multimedia messaging system of the prior art.

A multimedia messaging system of the prior art is illustrated in FIG. 1. The multimedia messaging system 10 includes a PBX (Private Branch eXchange) telephone system 12, a messaging server 14, a LAN (Local Area Network) 16, and an Internet gateway 18. Incoming telephone lines 20 are coupled to the PBX telephone system 12. The PBX telephone system 12 is coupled to the messaging server 14. The messaging server 14 is coupled to the LAN 16. The Internet gateway 18 is coupled to the messaging server 14.

The PBX telephone system 12 includes a PBX 22 and first, second, and third telephones, 24, 26, and 28. The first, second, and third telephones, 24, 26, and 28, are coupled to the PBX 22. The PBX 22 is coupled to the messaging server 14. The LAN 16 includes a file server 30, a printer 32, and first, second, and third computers, 34, 36, and 38. The LAN 16 couples the file server 30, the printer 32, and the first, second, and third computers, 34, 36, and 38, together.

It is well known in the art that the multimedia messaging system 10 can be configured with more or less telephones, computers, file servers, or printers. Also, it is well known in the art that the Internet gateway 18 could be replaced by another type of network connection or could be eliminated altogether.

The multimedia messaging system 10 manages multiple message formats including voice messages, facsimile (fax) messages, text messages, and MIME (Multipurpose Internet Mail Extension) messages including one or more binary components.

A voice message enters the multimedia messaging system 10 via one of the telephone lines 20, via the first, second, or third telephones, 24, 26, or 28, via the Internet gateway 18, or via a microphone coupled to the first, second, or third computer, 34, 36, or 38. The voice message is stored on the messaging server 14.

A voice message recipient retrieves the voice message by accessing the messaging server 14 via an external telephone, via the first, second, or third telephone, 24, 26, or 28, or via the first, second, or third computers, 34, 36, or 38. When accessing the messaging server 14 via the external telephone or via the first, second, or third telephone, 24, 26, or 28, the voice message recipient retrieves the voice message using a telephone user interface. The telephone user interface provides access to the voice message via touch-tone telephone keys and a voice prompted menu system. When accessing the voice mail message using the first, second, or third computers, 34, 36, or 38, the voice message recipient uses a voice playback/record GUI (Graphical User Interface) of the prior art and listens to the voice message via a speaker coupled to the first, second, or third computer, 34, 36, or 38.

Figure 2:
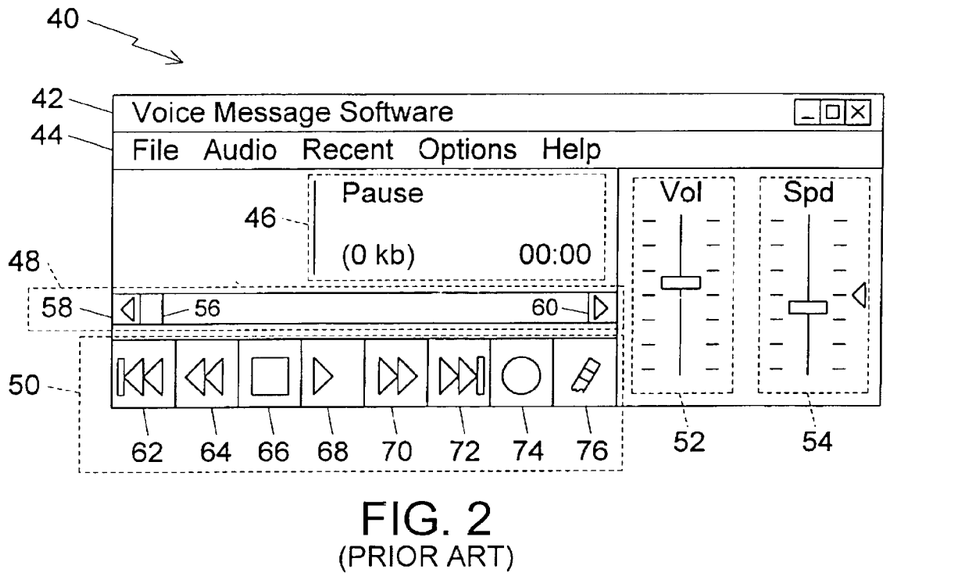
FIG. 2 illustrates a voice playback/record GUI (Graphical User Interface) of the prior art.

The voice playback/record GUI of the prior art is illustrated in FIG. 2. The voice playback/record GUI 40 includes a title bar 42, a drop-down menu bar 44, a message status window 46, a progress display bar 48, a message control bar 50, a volume control 52, and a speed control 54. It is well known in the art that GUIs in general can be arranged in a multitude of formats and styles, so the voice playback/record GUI 40 should be understood to be an example format and an example style selected from the multitude of formats and styles.

The title bar 42 of the voice playback/record GUI 40 indicates a software title, which in this case is "Voice Message Software," a generic title. The drop-down menu bar 44 includes the headings of "File," "Audio," "Recent," "Options," and "Help." The message status window 46 indicates whether the voice message is in "Play" mode, "Pause" mode, or "Record" mode. The message status window 46 also indicates a current location within the message. In FIG. 2, the voice message is in the "Pause" mode and the current locations is indicated as "0 kb" and "00:00." The latter indicates "00" minutes and "00" seconds.

The progress display bar 48 includes a progress display indicator 56, a move backward button 58, and a move forward button 60. As the voice message is being played, the progress display indicator 56 moves across the progress display bar 48 from left to right. The move backward and move forward buttons, 58 and 60, are used to move backward or forward within the voice message. The message control bar 50 includes a go-to-beginning icon 62, a skip back icon 64, a stop icon 66, a play icon 68, a skip forward icon 70, a go-to-end icon 72, a record icon 74, and an erase icon 76, all of which are clickable icons used to facilitate control of the voice message.

Faced with the problem of finding a specific piece of information within a voice message, such as an address, a telephone number, or a day and time, the voice message recipient will either listen from the beginning of the message until the voice message recipient hears the specific piece of information or the voice message recipient will use the skip forward icon 70 or skip back icon 64 to try to locate the specific piece of information.

It would be advantageous to be able to find a specific piece of information within a voice message more efficiently.

What is needed is a method of efficiently finding a specific piece of information within a voice message.

SUMMARY OF THE INVENTION

The present invention is a method of bookmarking a voice message including the step of marking the voice message with a bookmark in a bookmark location. The present invention also includes a method of accessing the voice message at the bookmark location by selecting the bookmark.

DETAILED DESCRIPTION OF THE PREFERRED EMBODIMENT

Figure 3:
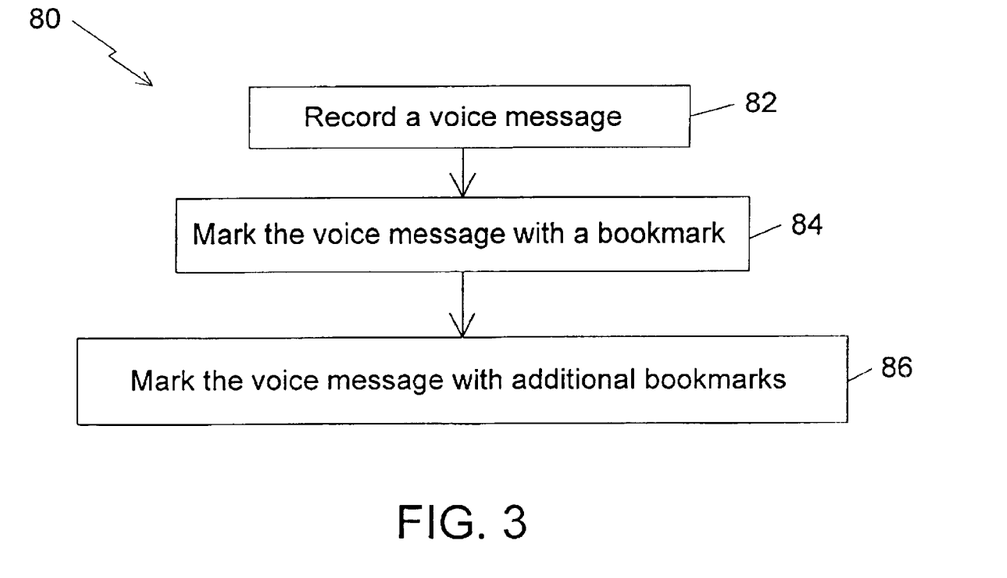
FIG. 3 illustrates the preferred bookmarking method of the present invention.

The preferred bookmarking method of the present invention is illustrated in FIG. 3. The preferred bookmarking method 80 includes first, second, and third steps, 82, 84, and 86. In the first step 82, a voice message author begins recording the voice message. In the second step 84, the voice message author marks the voice message with a first bookmark, using a user interface, while continuing to record the voice message. In the third step 86, the voice message author marks the voice message with additional bookmarks while continuing to record of the voice message. It will be readily apparent to one skilled in the art that the voice message author can pause the recording while marking the voice message with the first bookmark and the additional bookmarks. It will also be readily apparent to one skilled in the art that the preferred bookmarking method 80 does not necessarily include the third step 86 so that the voice message is not marked with the additional bookmarks.

Figure 4:
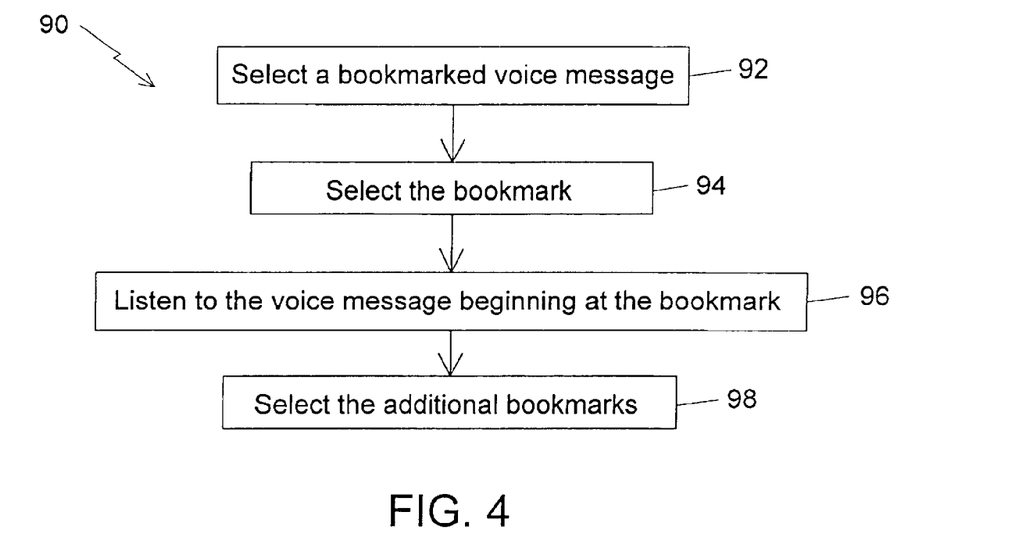
FIG. 4 illustrates the preferred bookmark accessing method of the present invention.

The preferred bookmark accessing method of the present invention is illustrated in FIG. 4. The preferred bookmark accessing method 90 includes fourth, fifth, sixth, and seventh steps, 92, 94, 96, and 98. In the fourth step 92, a listener, such as a voice message recipient, selects the bookmarked voice message. In the fifth step 94, the listener indexes to the bookmark within the voice message using the user interface. In the sixth step 96, playback begins at the bookmark and the listener listens to the bookmarked voice message beginning at the bookmark. Upon the listener selecting the bookmark in the fifth step 94, a player automatically positions playback at the bookmark and begins to play continuously so that the listener listens in the sixth step 96 until the playback is interrupted by the listener or until a voice message end is reached. In the seventh step 98, the listener listens to more of the bookmarked voice message by selecting the additional bookmarks. Alternatively the preferred bookmark accessing method 90 does not include the seventh step 98 so that the listener does not access the additional bookmarks.

Figure 5:
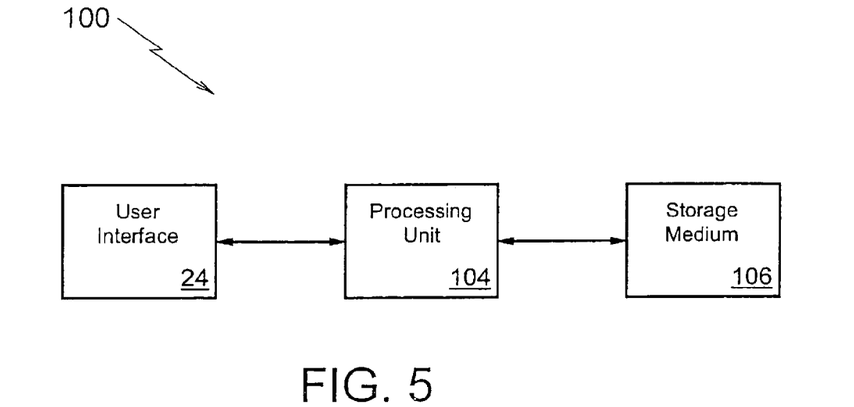
FIG. 5 illustrates the preferred apparatus for bookmarking the voice message of the present invention.

A voice message apparatus of the present invention is illustrated in FIG. 5. The voice message apparatus 100 includes a user interface 102, a processing unit 104, and a storage media 106. The user interface 102 is coupled to the processing unit 104. The processing unit 104 is coupled to the storage media 106. The user interface 102 includes a microphone and a speaker. Preferably, the voice message apparatus is a computer where the user interface 102 includes a voice playback/record GUI (Graphical User Interface), where the processing unit 104 is a computer processing unit, where the storage media 106 is a computer disk drive, and where the preferred bookmarking method 80 (FIG. 3) and the preferred bookmark accessing method 90 (FIG. 4) are implemented as computer software. Preferably, the computer is arranged as part of a multimedia messaging system where the storage media 106 is part of a messaging server. Alternatively, the storage media is any type of magnetic, optical, or magneto-optical storage, and the computer is a stand-alone computer or the computer is part of a different type of network.

Figure 6:
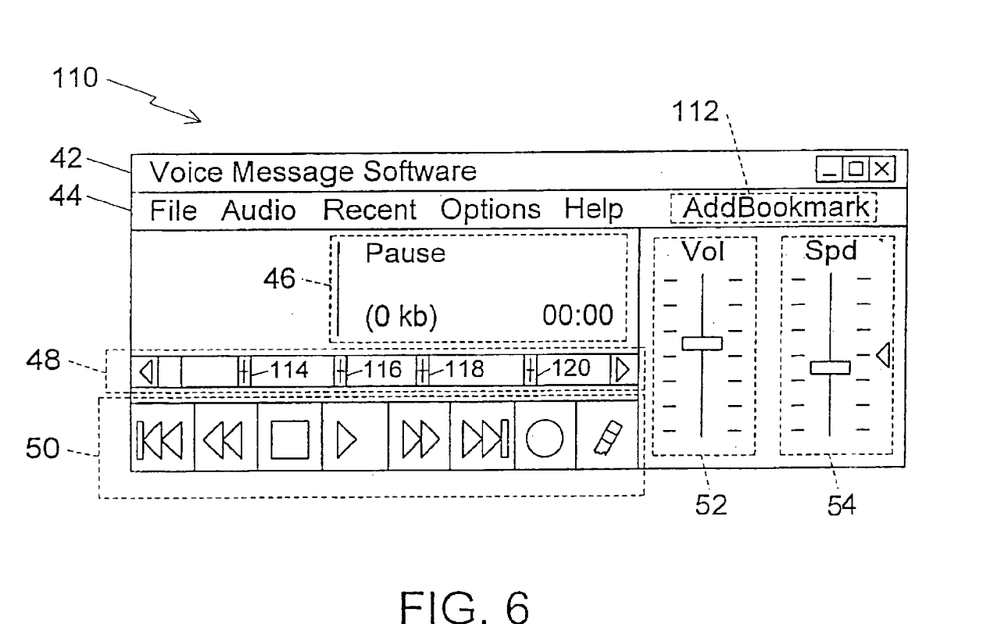
FIG. 6 illustrates a voice playback/record GUI of the present invention.

The voice playback/record GUI of the present invention is illustrated in FIG. 6. the voice playback/record GUI 110 includes a title bar 42, a drop-down menu bar 44, a message status window 46, a progress display bar 48, a message control bar 50, a volume control 52, a speed control 54. The drop-down menu bar 44 includes an add-bookmark function 112, which is depicted as "AddBookmark" in FIG. 6. It will be readily apparent to one skilled in the art that the add-bookmark function 112 can be implemented in numerous formats. For example, the add-bookmark function could be depicted as a clickable icon and added to the message control bar 50.

The progress display bar 48 includes first, second, third, and fourth bookmark indicators, 114, 116, 118, and 120. To access the first, second, third, or fourth bookmarks, 114, 116, 118, or 120, the listener clicks the first, second, third, or fourth bookmarks, 114, 116, 118, or 120. It will be readily apparent to one skilled in the art that the first, second, third, and fourth bookmarks, 114, 116, 118, and 120, can be implemented in numerous formats.

First and second alternative bookmarking methods of the present invention account for a possible cognitive delay between a decision to place the first bookmark, or the additional bookmarks, and an actual placement of the first bookmark, or the additional bookmarks. The first alternative bookmarking method of the present invention method adds a first additional step to the preferred bookmarking method 80. The first additional step places the bookmark and the additional bookmarks at utterance beginning locations. The utterance beginning locations are beginning of utterances. The utterance beginning locations are found using an intelligent search. The intelligent search preferably employs a voice processing technique. The voice processing technique is selected from a group including a voice parameter, an amplitude, a plosive, a pitch change, a number recognition, and a word recognition.

The second alternative bookmarking method of the present invention adds a second additional step to the preferred bookmarking method 80. The second additional step places the bookmark and the additional bookmarks at locations that are a specific time duration before an actual selection of the bookmark and the additional bookmarks. It will be readily apparent to one skilled in the art that the specific time duration can be a user selected parameter.

Figure 7:
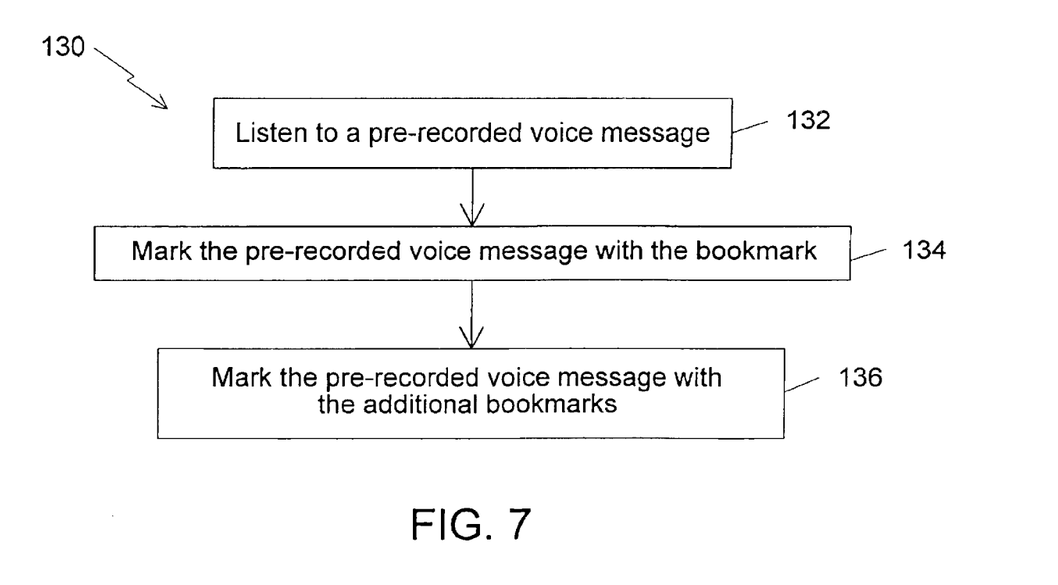
FIG. 7 illustrates an alternative bookmarking method of the present invention.

A third alternative bookmarking method of the present invention is illustrated in FIG. 7. The third alternative bookmarking method 130 includes eighth, ninth, and tenth steps, 132, 134, and 136. In the eighth step 132, a bookmarking person listens to a pre-recorded voice message. In the ninth step 134, the bookmarking person marks the pre-recorded voice message with the bookmark, while listening to the pre-recorded voice message using the user interface. In the tenth method step 136, the bookmarking person marks the pre-recorded voice message with the additional bookmarks, while continuing to listen to the pre-recorded. The bookmarking person can be the voice message author, the voice message recipient, or a person that is not the voice message author or the voice message recipient but who has access to the voice message.

A fourth alternative bookmarking method of the present invention adds a third additional step to the third alternative bookmarking method 130. In the third additional step, the listener annotates the bookmark and the additional bookmark with a type of information. The type of information is selected from the group including text and icons.

Figure 8:
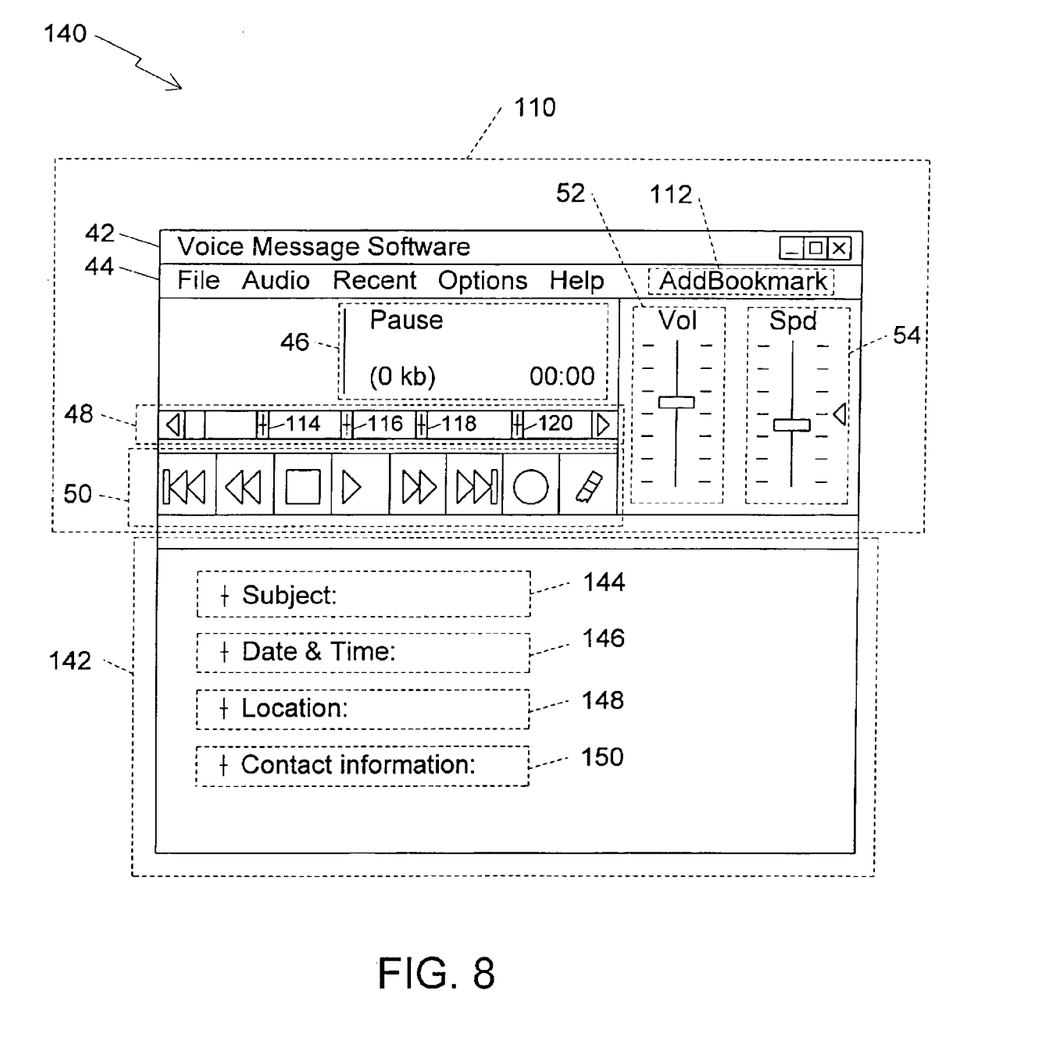
FIG. 8 illustrates a first alternative voice playback/record GUI of the present invention.

A first alternative voice playback/record GUI of the present invention, which implements the fourth alternative bookmarking method, is illustrated in FIG. 8. The first alternative voice playback/record GUI 140 adds an annotation window 142 to the voice playback/record GUI 110. The annotation window 142 includes first, second, third, and fourth annotations, 144, 146, 148, and 150, which correspond to the first, second, third, and fourth bookmarks, 114, 116, 118, and 120. The first, second, third, and fourth annotations, 144, 146, 148, and 150, indicate sections of the voice message. It will be readily apparent to one skilled in the art that the first, second, third, and fourth bookmarks, 114, 116, 118, and 120, and the first, second, third, and fourth annotations, 144, 146, 148, and 150 can be numbered or lettered so that a correspondence between the bookmarks and the annotations is explicit.

Figure 9:
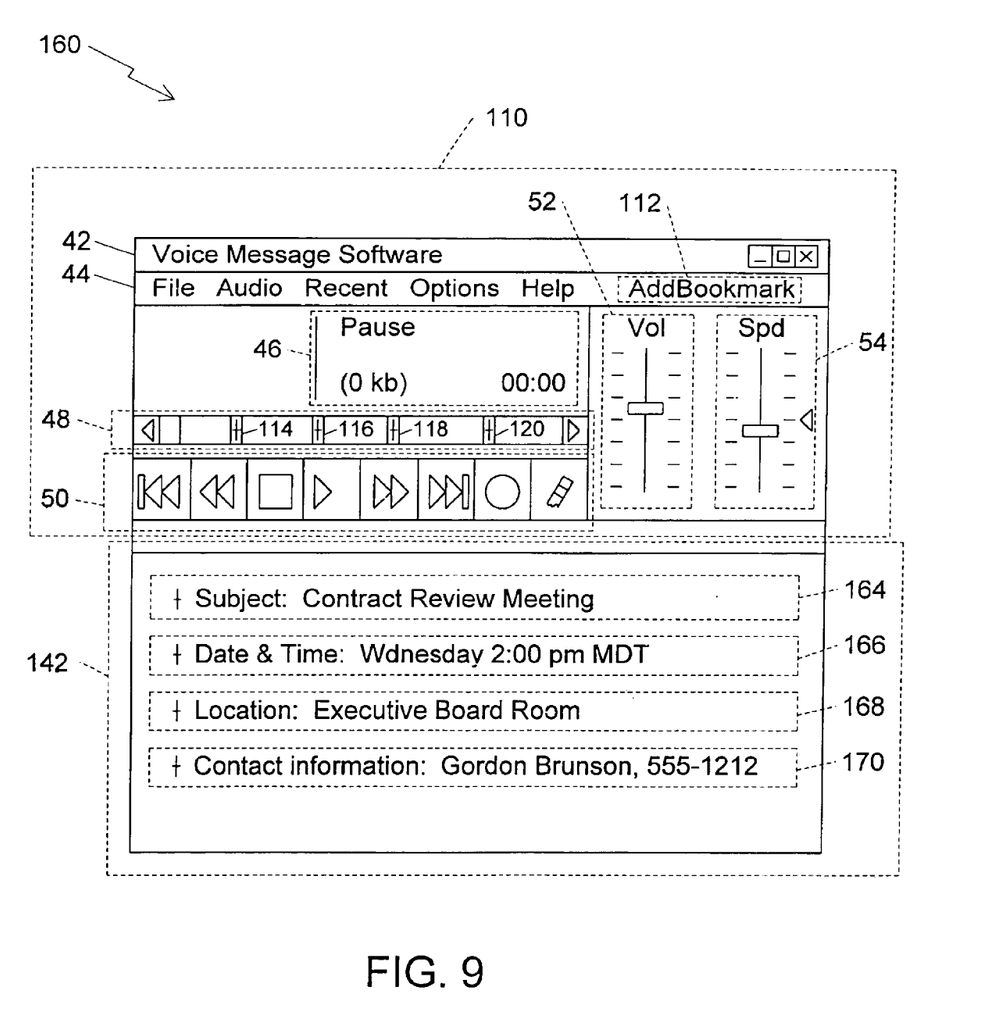
FIG. 9 illustrates a second alternative voice playback/record GUI of the present invention.

A second alternative voice playback/record GUI of the present invention is illustrated in FIG. 9. The second alternative voice playback/record GUI 160 replaces the first, second, third, and fourth annotations, 144, 146, 148, and 150, with first, second, third, and fourth detailed annotations, 164, 166, 168, and 170. The first, second, third, and fourth detailed annotations, 164, 166, 168, and 170, add message specific information to the first, second, third, and fourth annotations, 144, 146, 148, and 150.

A first alternative voice message apparatus is a telephone system and voice processing equipment coupled to the storage media 106. For the telephone system and the voice processing equipment, the user interface 102 is a telephone user interface (TUI), which includes touch tone keys and a voice prompted menu. The voice processing equipment is that which is normally associated with providing the TUI. The processing unit 104 includes first electrical circuitry associated with the telephone system and the voice processing equipment. During playback of the voice message, the voice message recipient, upon hearing an important passage, presses a place bookmark touch tone key to set the first bookmark. The first bookmark is saved with the voice message so that the first bookmark is available in a subsequent playback of the voice message. This allows direct navigation to the important passage using the TUI or the voice playback/record GUI. When using the TUI, the listener presses a go-to-bookmark touch tone key to commence playback at the first bookmark. It will be readily apparent to one skilled in the art that the voice message recipient can also place the additional bookmarks using the TUI.

A second alternative voice message apparatus is an answering machine. For the answering machine, the user interface 102 is a first mechanical user interface, which includes first buttons/display on the answering machine. The processing unit 104 includes second electrical circuitry associated with the answering machine. The storage media 106 is an answering machine storage media. Alternatively, the user interface 102 for the answering machine is the TUI.

A third alternative voice message apparatus is a recording machine. For the recording machine, the user interface 102 is a second mechanical user interface, which includes second buttons/display on the recording machine. The processing unit 104 includes third electrical circuitry associated with the recording machine. The storage media 106 is a recording machine storage media.

An alternative user interface of the present invention is a voice command user interface.

An alternative embodiment of the present invention automatically bookmarks the voice message using automatic search and locate pattern matching in which specific voice message content is automatically bookmarked. The specific voice message content is selected from the group including phone numbers, e-mail addresses, physical addresses, dates, and times.

It will be readily apparent to one skilled in the art that other various modifications may be made to the preferred embodiment without departing from the spirit and scope of the invention as defined by the appended claims.

We claim:

1. An apparatus for marking and accessing bookmarks within a voice message comprising:
   a. a storage media to store the voice message;
   b. a processing unit coupled to the storage media to automatically search the voice message for a predetermined content and automatically bookmark located predetermined content within the voice message, wherein each bookmark is generally configurable to be positioned anywhere within the voice message, and each bookmark is specifically positioned directly at the predetermined content such that accessing the bookmark directly accesses the predetermined content, wherein the predetermined content is selected from the group consisting of telephone numbers, email addresses, physical addresses, dates, and times; and
   c. a user interface coupled to the processing unit to access the voice message at the bookmark, wherein the bookmarks are not defined as major blocks of either speech or silence.

2. The apparatus of claim 1 wherein the processing unit automatically searches for additional predetermined content and automatically bookmarks located additional predetermined content within the voice message.

3. The apparatus of claim 1 wherein the predetermined content is an utterance and the bookmark is placed at an utterance beginning location.

4. The apparatus of claim 3, wherein the utterance beginning location is found using an intelligent search.

5. The apparatus of claim 4 wherein the intelligent search includes a voice processing technique.

6. The apparatus of claim 5 wherein the voice processing technique utilizes a voice parameter, the voice parameter being selected from the group consisting of an amplitude, a plosive, a pitch change, a number recognition, a word recognition, and a combination thereof.

7. The apparatus of claim 1 wherein the user interface is selected from the group consisting of a graphical user interface, a telephone user interface, a mechanical user interface, and a voice command user interface.

8. A method of bookmarking a voice message comprising:
   a. automatically searching the voice message for a predetermined content, wherein the predetermined content is selected from the group consisting of telephone numbers, e-mail addresses, physical addresses, dates, and times;
   b. locating the predetermined content; and
   c. automatically bookmarking the predetermined content at a first bookmark location with a first bookmark, wherein the first bookmark is positioned directly at the predetermined content such that accessing the first bookmark directly accesses the predetermined content, further wherein the first bookmark is generally configurable to be positioned anywhere within the voice message, wherein the bookmarks are not defined as major blocks of either speech or silence.

9. The method of claim 8 further comprising automatically searching for additional predetermined content within the voice message and automatically bookmarking located additional predetermined content at additional bookmark locations with additional bookmarks.

10. The method of claim 8 wherein the predetermined content is an utterance and the first bookmark is placed at an utterance beginning location.

11. The method of claim 10 wherein the utterance beginning location is found using an intelligent search.

12. The method of claim 11 wherein the intelligent search includes a voice processing technique.

13. The method of claim 12 wherein the voice processing technique utilizes a voice parameter, the voice parameter being selected from the group consisting of an amplitude, a plosive, a pitch change, a number recognition, a word recognition, and a combination thereof.

14. The method of claim 8 further comprising accessing the voice message at the first bookmark location by selecting the first bookmark.

15. The method of claim 14 wherein the first bookmark is selected using a user interface.

16. The method of claim 15 wherein the user interface is selected from the group consisting of a graphical user interface, a telephone user interface, a mechanical user interface, and a voice command user interface.

17. The apparatus of claim 1 wherein each bookmark includes a bookmark annotation.

18. The apparatus of claim 17 wherein the bookmark annotation is accessible via the user interface.

19. The method of claim 9 wherein each bookmark includes a bookmark annotation.

20. The method of claim 19 wherein the bookmark annotation is accessible using a user interface.

* * * * *